G. R. SCHUELER.
PRESS.
APPLICATION FILED DEC. 23, 1914.
1,152,919.
Patented Sept. 7, 1915.
6 SHEETS—SHEET 4.
FIG. 4.
FIG. 5.
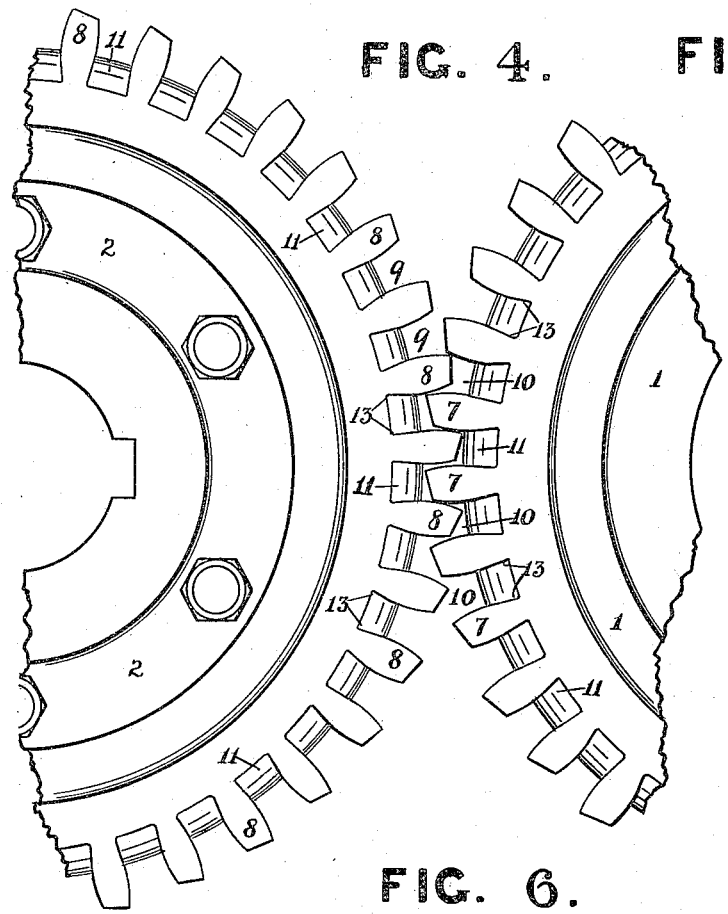
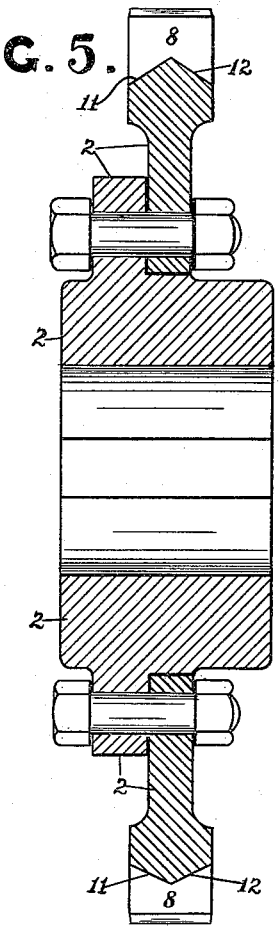
FIG. 6.
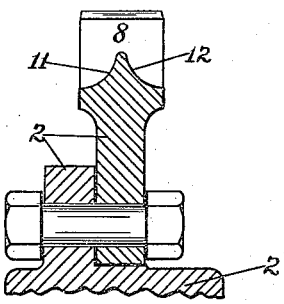

G. R. SCHUELER.
PRESS.
APPLICATION FILED DEC. 23, 1914.
1,152,919.
Patented Sept. 7, 1915.
6 SHEETS—SHEET 5.
FIG. 7.
FIG. 8.
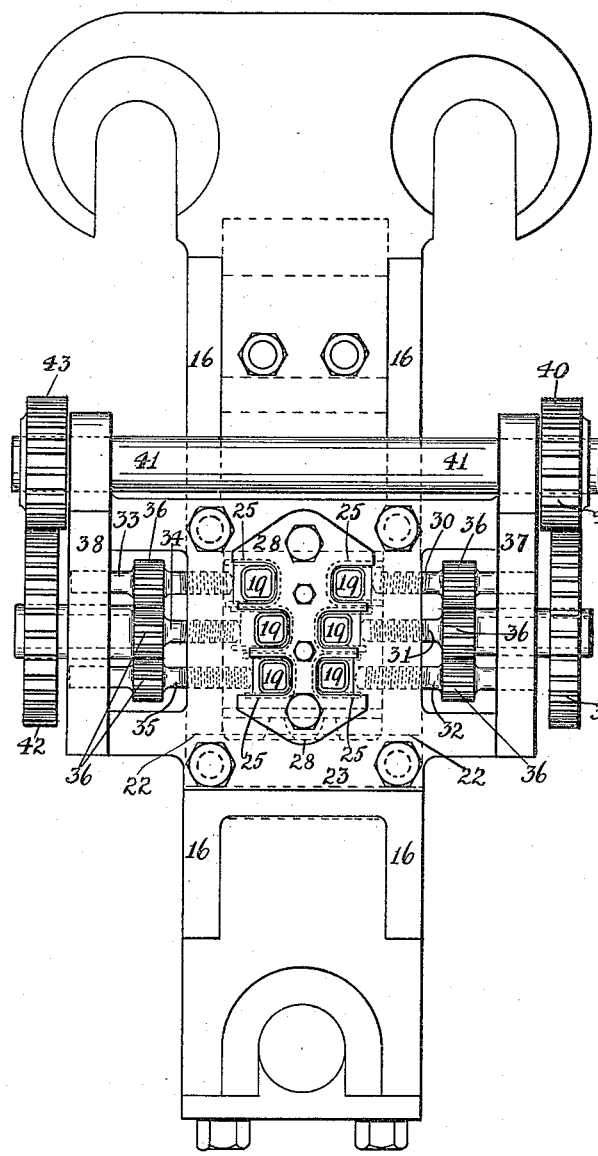
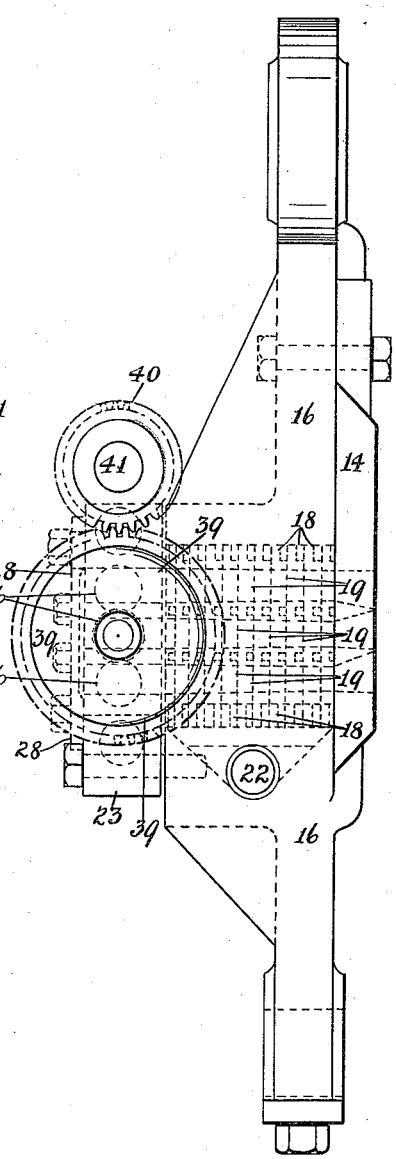
Witnesses:
W. E. Allen.
Wm H. Bates
Inventor
George R. Schueler
by Robert W. Jenner.
Attorney.

G. R. SCHUELER.
PRESS.
APPLICATION FILED DEC. 23, 1914.

1,152,919.

Patented Sept. 7, 1915.
6 SHEETS—SHEET 6.

Witnesses:
W. E. Allen
Wm H Bates

Inventor
George R. Schueler
by Herbert W. Jenner.
Attorney.

UNITED STATES PATENT OFFICE.

GEORGE RICHARD SCHUELER, OF KINGSTON-UPON-HULL, ENGLAND.

PRESS.

1,152,919.  Specification of Letters Patent.  Patented Sept. 7, 1915.

Application filed December 23, 1914. Serial No. 878,736.

*To all whom it may concern:*

Be it known that I, GEORGE RICHARD SCHUELER, a citizen of the United States, at present residing at 4 Pendrill street, Beverley Road, Kingston-upon-Hull, England, have invented certain new and useful Improvements in Presses; and I do hereby declare the following to be a full, clear, and exact description of the invention, such as will enable others skilled in the art to which it appertains to make and use the same.

This invention has for its object an improved machine or apparatus for expressing oil, juice or fluid from seeds, nuts, fruit, fish and materials and substances generally which contain oil, juice or fluid, and which is also adapted to produce shaped blocks or pieces from plastic materials or substances and the like.

In order that my invention may be readily understood and carried into effect, I have appended hereunto six sheets of explanatory drawings on which—

Figure 1:
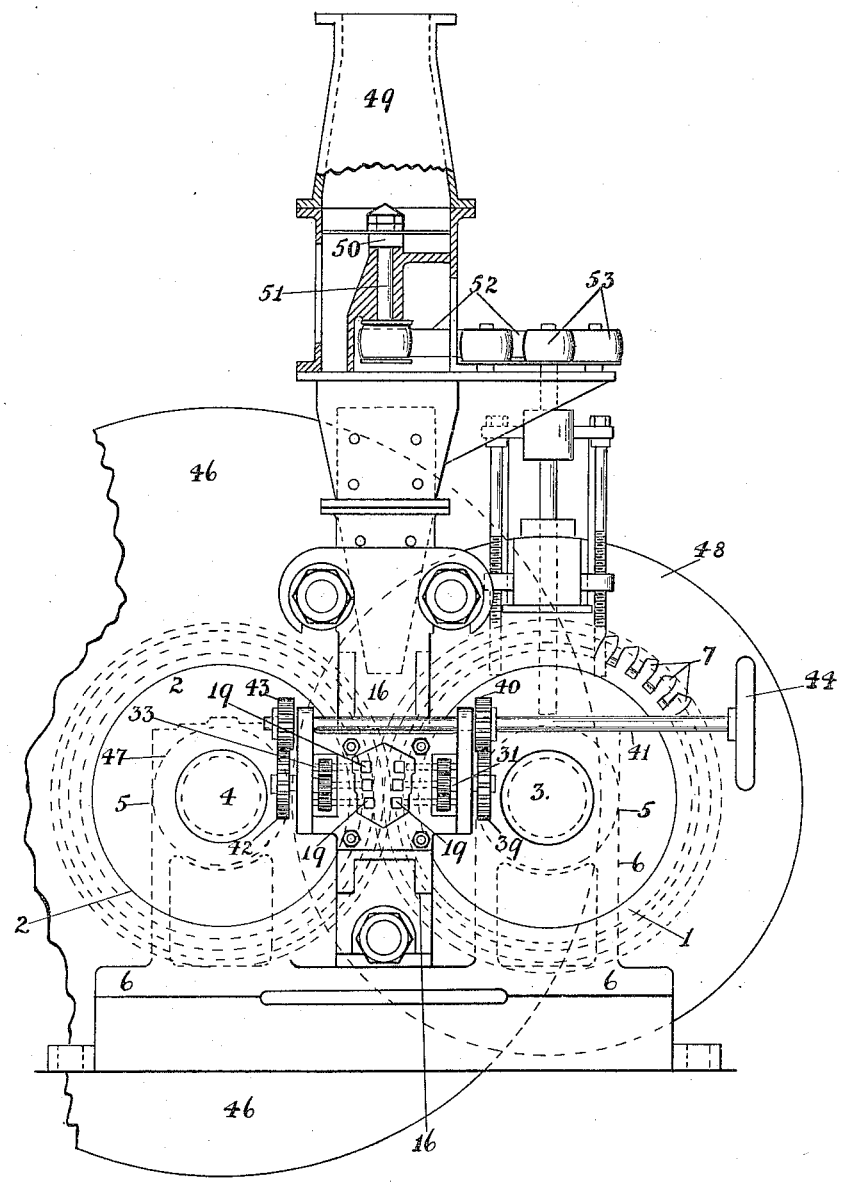
Figure 2:
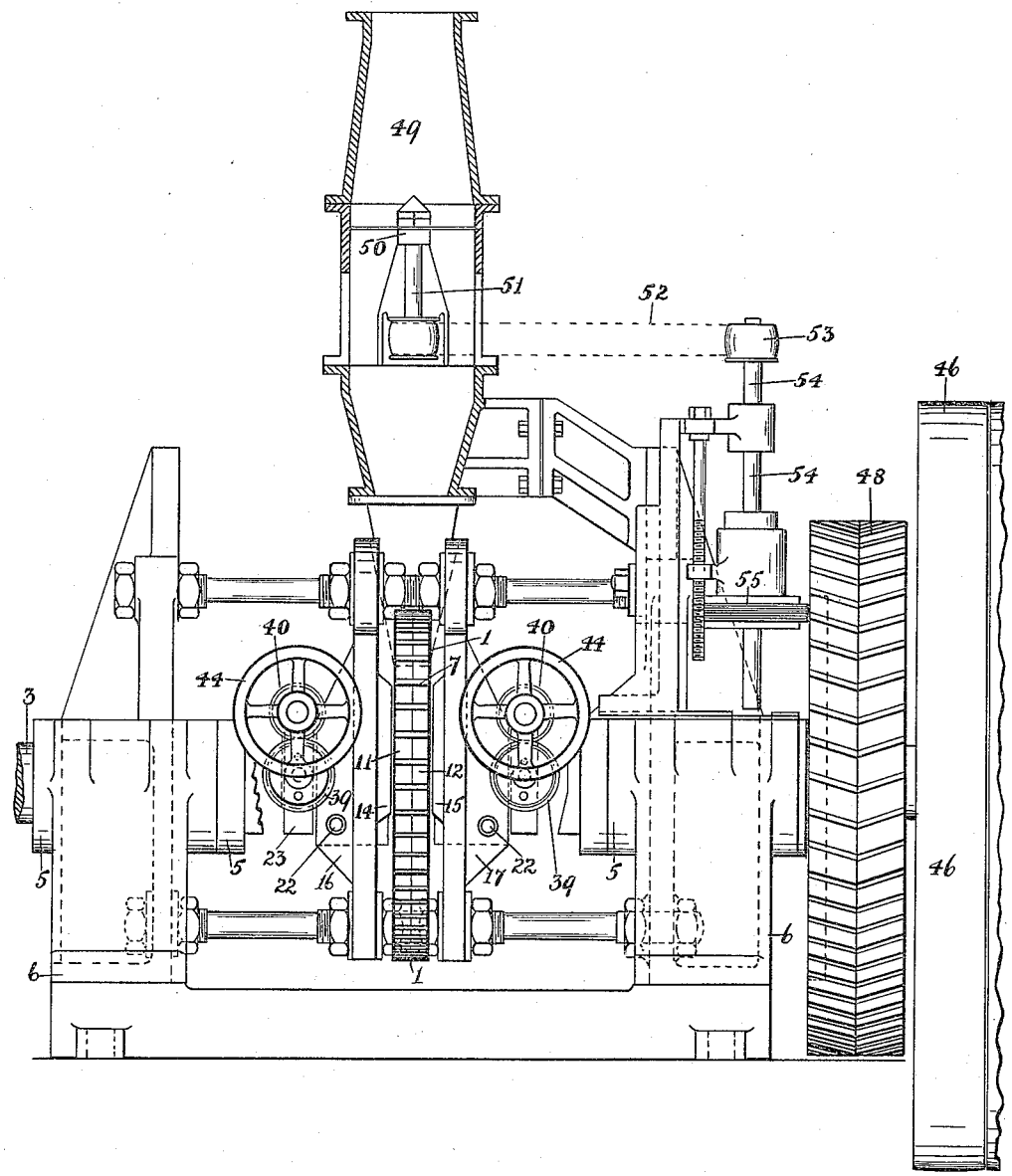
Figure 3:
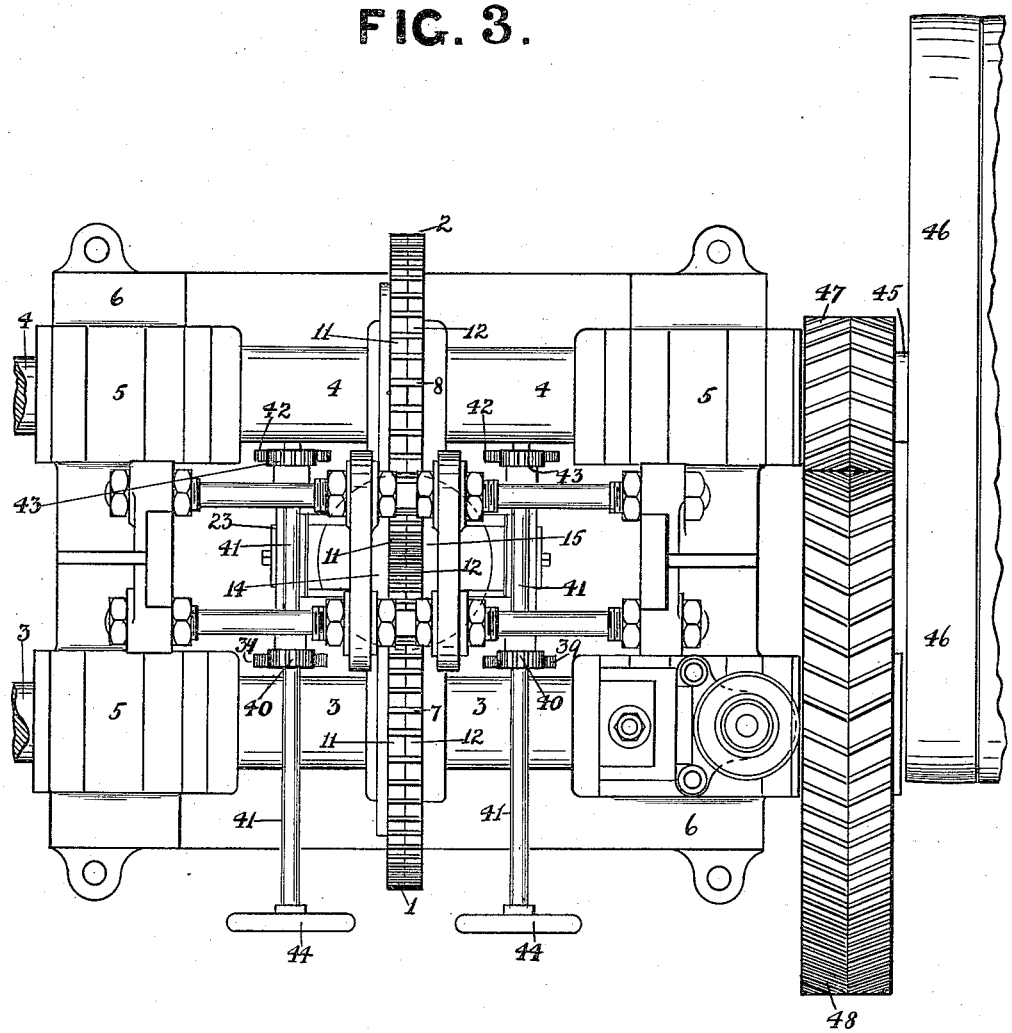
Figure 9:
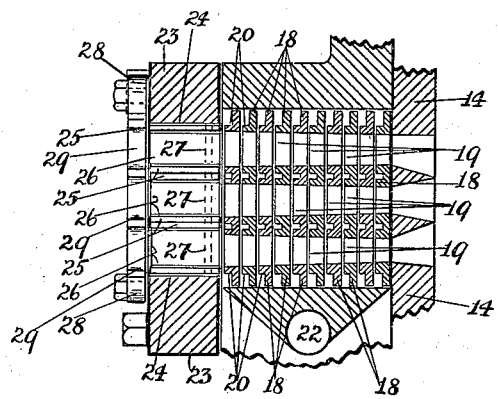
Figures 10, 11, 12, 13:
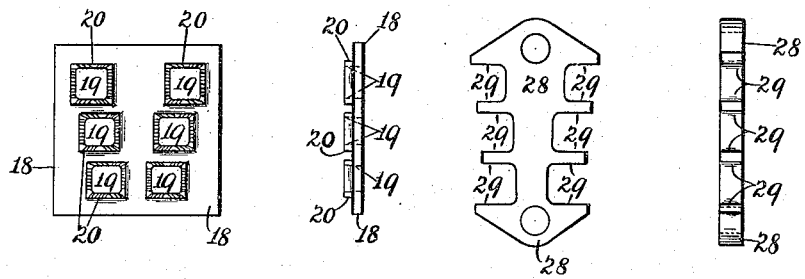
Figures 14, 15:
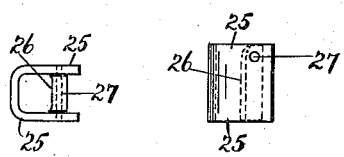

Figure 1 is a side view of apparatus in accordance with my invention for expressing oil or fluid from oil or fluid containing materials or substances and for forming the residuum into compressed lengths or pieces, the near bearings for the shafts of the two compressing wheels being omitted, Fig. 2 is a front view of same, and Fig. 3 is a plan view with the feed spout removed. Fig. 4 is a side view of a portion of each of the compressing wheels, Fig. 5 is a section through one of such wheels, and Fig. 6 is a similar section through a portion of a wheel showing a slightly modified shape of bottom or inner wall of the space between each two teeth, Fig. 7 is a front view of one of the frames which carry the cheek-pieces for inclosing the meshing point of the compressing wheels, and also shows the same provided with built up passages to form an extracting box, with a die-plate, and with means for regulating the size of the holes or passages through the die-plate, Fig. 8 is a side view of Fig. 7, Fig. 9 is a section through a portion of Fig. 8, Fig. 10 is a front view and Fig. 11 a side view of one of the series of plates used in the building up of the extracting box, Fig. 12 is a front view of the cover plate which keeps the bushes in the die plate in position, Fig. 13 is a side view of same, Fig. 14 is a front view of one of the bushes, and Fig. 15 is a plan view of same. Figs. 4 to 15 inclusive are drawn to a larger scale than Figs. 1, 2 and 3.

In constructing a machine or apparatus in accordance with my invention, and as illustrated in the appended drawings, I employ a pair, or a plurality of pairs of suitable toothed wheels, one pair only of such wheels, 1 and 2 being shown in the machine or apparatus illustrated, said pair of wheels being so mounted in relation to each other, the one on a shaft 3 and the other on a shaft 4 rotatable in suitable bearings 5 carried by suitable uprights or standards 6, that as they rotate, their teeth 7, 8 mesh at the point of engagement of the two wheels, the teeth 7 of the wheel 1 filling, or almost filling the spaces 9 between the teeth 8 of the wheel 2, and the teeth 8 of the wheel 2 filling, or almost filling the spaces 10 between the teeth 7 of the wheel 1 at the meshing or engaging point of the said two wheels, in known manner, whereby compression of material or the like fed between the wheels takes place in the spaces between the teeth of both wheels simultaneously as the wheels rotate.

The metal which forms what I will call the bottom or inner wall of the space between each two teeth of each wheel is, according to the present invention, of novel shape, in that, in place of being flat it is of angle or like shape in cross-section as shown more clearly at Figs. 5 and 6, thereby to provide two inclined or curved surfaces 11, 12 whereby the material fed to said spaces is caused to be delivered at each side of the wheel, and the root of each tooth of the wheels is reduced from the point where it joins the angle or like shaped bottom or inner wall of the space, to form a wedge-shaped pocket 13, as shown more clearly at Fig. 4, in which pockets the material compressed in the spaces between the teeth rests or is held until such time as it is required to be expelled.

Situated at each side of the compressing wheels 1 and 2, or of each two wheels, if a plurality of pairs of wheels are employed, is a suitable plate, which plates I will call "cheek plates" said cheek-plates 14, 15 being each fitted in or detachably secured to a frame whereby each can be removed when worn, to allow of a new one being substituted, the frames 16, 17 with the cheek-plates 14, 15 being so fitted as to inclose the meshing point of the wheels 1 and 2 and to project to a suitable distance above such point to insure the material fed to the wheels to be compressed, falling between the two wheels, whereby it is caused to enter the spaces between the teeth of the two wheels in known manner, as the wheels rotate. Each cheek plate has suitably shaped apertures in it at the points which correspond with the position of the wedge shaped pockets of the wheels 1 and 2 where the teeth of the said two wheels are in engagement, the material acted on by the teeth of the wheels in the spaces of the respective wheels passing through these apertures when expelled from the wedge shaped pockets of the wheels.

Fitted, according to one mode, at each side of the pair of compressing wheels 1 and 2, or of each pair of wheels, if a plurality of pairs of wheels are employed, are extracting boxes or devices of any suitable kind, into which extracting boxes the material when expelled from the pockets in the wheels 1 and 2 into the apertures in the cheek-plates 14, 15 passes, said extracting boxes having, according to a preferred mode, the same number of passages as there are apertures in a cheek plate, one type of extracting box being illustrated in longitudinal section at Fig. 9. Each extracting box consists of a number of plates 18 one of which is shown in front view at Fig. 10 and in side view at Fig. 11, each of which plates has a plurality of holes 19 through it, the number of holes preferably corresponding with the number of holes in the cheek plate up to which the extracting box fits. The holes 19 in any one plate are all preferably of the same size but are slightly different in size to those in adjoining plates whereby when the plates are placed face to face as shown in Fig. 9, the passages formed by the holes in the several plates increase in size in the direction in which the material is caused to travel through the extracting box or device, with the result that the material as it passes through the passages expands gradually or step by step, which expansion has the effect of preventing the formation of a skin around the material, or should one chance to form, of breaking it up, thereby allowing of the oil or the like fluid in the material escaping freely.

The plates 18 are thickened on one side at the points where the holes are situated, to form boss-like portions 20 around the holes, fine grooves being made in the face of each boss-like portion for the expressed oil or liquid to escape through.

The plates to form one extracting box, are arranged as before described, in a recess or chamber 21 provided for the purpose in the frame 16, and the plates to form the other extracting box are arranged in a similar chamber in the other frame 17, the side walls of the said chambers forming the side walls of the extracting boxes.

A passage 22 is provided in the frames for the oil or liquid expelled from the material in the extracting boxes to escape through.

At the front of each frame, according to the arrangement shown, is fitted a die-plate 23 which has holes or passages 24 through it, in each of which holes is fitted a bush 25, shown removed at Figs. 14 and 15. Each bush is provided with a hinged or pivoted door or portion 26 adapted to be turned on its pivot 27 to control the size of the passage through the bush, each door when closed or partially closed forming the resistance against which the material traveling through the passages in the extracting box and die-plate, is pressed. A plate 28 is secured in front of the die-plate to keep the bushes in position in the holes in the die-plate, said plate having recesses 29 in its sides at the points where the holes in the die-plate are situated, to allow the compressed material to exude through the die-plate.

Means of any suitable kind may be employed for adjusting simultaneously all the hinged doors of the bushes in the passages in the die-plate, one and a convenient arrangement which I describe by way of example only, consisting in providing holes each tapped with a screw-thread, in the ends of the die-plates, each hole running through to a passage in which a bush is situated, and in turning into each hole the screw-threaded end of a spindle.

In the accompanying drawings, each extracting box is shown as having six passages arranged in two series of three each, consequently there are two series of bushes, three in each series, and two series of three spindles, three of such spindles 30, 31 and 32 being turned into the right hand end, and the other three 33, 34 and 35 turned into the left hand end of the die plate 23. The center spindle of each series has a different direction of screw-thread to that on the spindle above and below it. Each spindle is provided with a pinion or like toothed wheel, each marked 36, the pinion or like wheel on the center spindle of each series meshing with the pinion or like wheel on the spindle above and below. The plain outer ends of the series of spindles 30, 31, 32 are supported in bearings in a plate 37, and the corresponding ends of the spindles 33, 34, 35 are supported in bearings in a similar plate 38.

On the outer end of the center spindle 31 is mounted a spur or like toothed wheel 39 which meshes with a pinion or like wheel 40 on a shaft 41, and on the spindle 34 is mounted a spur or like wheel 42 which meshes with a second pinion or like wheel 43 on said shaft 41, which shaft 41 is provided with a hand wheel 44, or other suitable means to enable it to be rotated. By rotating the shaft 41 in the required direction, the several spindles are rotated simultaneously, the screw-threaded end of each being thus turned into its hole in the dieplate and acts on the door of a bush and presses it inward, the several doors being acted on simultaneously and all moved to exactly the same extent.

Driving of the compressing wheels 1 and 2 may be effected by any suitable means, the means shown in the accompanying drawings consisting in loosely mounting on the shaft of the wheel 2, a bush 45 on which are keyed a pulley 46 and a pinion wheel 47, the pinion gearing with a spur wheel 48 keyed on the shaft of the compressing wheel 1. The pinion wheel 47 drives the spur wheel 48 which in turn drives the compressing wheel 1, which compressing wheel drives the compressing wheel 2 by gearing therewith.

The material or the like to be compressed is preferably fed to the compressing wheels in regulated quantities by any means suitable for the purpose, but preferably through a feed spout in which is located a suitable helix or portion or portions of a worm screw 49 indicating the feed spout, 50 the helix or the like, 51 the spindle on which the helix or the like is mounted, one means of driving the spindle 51 consisting of a belt 52 driven by a pulley 53 mounted on a vertical spindle 54 provided with a disk 55 which runs in frictional contact with one side of the gear wheel 48, the driving of the feed controller thus being regulated by the rotation of the spur wheel and the compressing wheels.

The mode of operation of the machine or apparatus illustrated, is as follows:—The material to be compressed is fed into the feed spout 49 and falls on to the helix or the like 50 therein which cuts through it thus severing as it were a given portion at each rotation, the severed portion falling between the compressing wheels 1 and 2 and into the spaces between the teeth of each wheel at the point where the teeth are commencing to mesh. The teeth of each wheel compress the material in the spaces of its fellow wheel during the meshing period, the material as it is being compressed being divided into two portions by the angle or like shaped back or inner wall of the space, said two portions being forced into the wedge shaped pockets 13 at each side of the wheel in which pockets the two compressed portions of material are held during one revolution of the wheel, such portions being expelled by the portions next formed, each two portions formed in a space expelling the two portions last formed in the same space, one portion being expelled at one side and the other at the opposite side of the wheel, material being compressed in spaces in both wheels simultaneously and being expelled from both wheels in the manner described. As each compressed portion of material is expelled from a pocket, it passes through one of the apertures in the cheek plate situated at that side of the wheel, consequent on such aperture being so situated that the pocket in which such portion is held comes during its rotation, into line with such aperture and the compressed portion is at that time forced into such aperture by the portion of material being compressed at the time.

In the arrangement shown, compressed portions of material are expelled practically simultaneously from three pockets at each side of each wheel, six passing into an extracting box at one side of the pair of wheels and six into a similar extracting box at the opposite side of the wheels, the material being subjected to further compression in the extracting boxes caused by the continuous feed of material by the compressing wheels, which compression expresses the oil or liquid out of the material, such oil or liquid flowing down the faces of the plates 18 provided with holes 19 which form the gradually enlarging passages, and out through the passage 22 provided for the purpose, the residuum passing out through the holes in the die-plate in the form of lengths or pieces of compressed material.

In cases where the machine or apparatus is to be employed for producing shaped blocks or pieces from plastic or like materials or substances, and the expressing of oil or the like is not a part of the process, suitable dies are substituted for the extracting boxes or the like, the plates which go to form the hopper or like device being so formed, if desired, as to effect the purpose of die-plates.

When a plurality of compressing wheels are employed, the machine frame and the wheel shafts 3 and 4 are extended, and the additional pair or pairs of wheels are mounted on the said shafts in relation to each other as described with reference to the compressing wheels 1 and 2, the other parts of the apparatus being duplicated as will be readily understood.

If desired, one only of the compressing wheels of the pair or of each pair may be provided with space bottom or inner walls and pockets formed as before described and illustrated in the accompanying drawings, the other wheel of the pair, or of each pair having flat space bottoms or inner walls and the usual type of tooth root.

I claim:—

1. In a press, two revoluble compressing wheels having intergearing teeth, the bottoms of the spaces between the teeth of one wheel being angle-shaped, thereby forming pockets at each side portion of the wheel into which the material is pressed by the teeth of the other wheel, and cheek plates arranged at the sides of the wheels and provided with outlet openings for the material compressed in the said pockets.

2. In a press, two revoluble compressing wheels having intergearing teeth, the bottoms of the spaces between the teeth of one wheel being angle-shaped and wider at the sides of the wheel than at its middle part, thereby forming wedge-shaped pockets at each side portion of the wheel into which the material is pressed by the teeth of the other wheel, and cheek plates arranged at the sides of the wheels and provided with outlet openings for the compressed material.

3. In a press, two revoluble compressing wheels having intergearing teeth, the bottoms of the spaces between the teeth of each wheel being angle-shaped, thereby forming pockets at each side portion of each wheel into which the material is pressed by the teeth of the wheels, and cheek plates arranged at the sides of the wheels and provided with outlet openings for the compressed material.

4. In a press, two revoluble compressing wheels having intergearing teeth, the bottoms of the spaces between the teeth of each wheel being angle-shaped, thereby forming pockets at each side portion of each wheel into which the material is pressed by the teeth of the wheels, cheek plates arranged at the sides of the wheels and provided with outlet openings for the compressed material, and extracting boxes secured against the cheek plates and provided with passages which register with the said outlet openings and having also small outlets for the escape of fluid.

5. In a press, two revoluble compressing wheels having intergearing teeth, the bottoms of the spaces between the teeth of each wheel being angle-shaped, thereby forming pockets at each side portion of each wheel into which the material is pressed by the teeth of the wheels, cheek plates arranged at the sides of the wheels and provided with outlet openings for the compressed material, extracting boxes secured against the cheek plates and provided with passages which register with the said outlet openings and having also small outlets for the escape of fluid, and, die plates secured against the extracting boxes and having holes which register with the outlet ends of the said passages and having also means for regulating the passage of the compressed material through the said holes to afford a predetermined resistance to its passage through the extracting boxes.

In testimony whereof I affix my signature, in presence of two witnesses.

GEORGE RICHARD SCHUELER.

Witnesses:
LOUIS E. KIPPAX,
FRED. H. RHODES.

Copies of this patent may be obtained for five cents each, by addressing the "Commissioner of Patents, Washington, D. C."